INVENTOR.
MORRIS D. NELSON
BY
W. H. Spouagle
ATTORNEY

INVENTOR.
MORRIS D. NELSON
BY
W. H. Sprague
ATTORNEY 2,971,088

FREQUENCY VARIATION RESPONSE CIRCUITS

Morris D. Nelson, New York, N.Y., assignor to Radio Corporation of America, a corporation of Delaware Filed Feb. 25, 1958, Ser. No. 717,356

6 Claims. (Cl. 329—113)

This invention relates to frequency variation response circuits for frequency modulated waves, and more particularly to frequency modulation detector circuits to demodulate such waves.

In the reception of a wave which has been frequency modulated by a signal, it is necessary to demodulate the wave to recover the modulating signal and to further process the recovered modulating signal, as by amplification, in order that it may be utilized. Many types of detector circuits for frequency modulated waves are known, but may require complicated and expensive circuitry. Also, most prior devices and circuits for demodulating a frequency modulated wave provide an output signal that must be amplified before it is applied to the utilization circuit, which, in a typical example, may be a loudspeaker.

It is therefore an object of this invention to provide an improved wave translating circuit for detecting frequency modulated waves.

It is another object of this invention to provide an improved frequency modulation detector circuit having a large power output signal for directly driving a utilization device.

It is a further object of this invention to provide an improved wave translating circuit responsive to frequency modulated waves that provides a high degree of amplitude modulation rejection and an output signal capable of directly driving a utilization device.

It is yet another object of this invention to provide an improved frequency modulation detector circuit having a relatively large power output signal and a high degree of amplitude modulation rejection, together with a minimum of complication and cost.

In accordance with the invention, a novel frequency modulation detector utilizes a beam switching electron tube which has two output or collector anodes and a pair of deflecting electrodes. An electron beam is formed by the tube and may be switched between the collector anodes by the action of the deflecting electrodes. A frequency modulated wave is impressed upon the detector circuit and detection of the signal is accomplished by varying the phase of the voltage applied to the deflecting electrodes of the electron tube in accordance with the frequency variations of the impressed wave to switch the electron beam between the collector anodes and provide the detected output signal between the anodes.

In accordance with another feature of the invention, the circuit is arranged to generate constant-amplitude self-oscillations at substantially the frequency of the impressed wave to be detected. When the wave is impressed upon the detector circuit, the self-oscillations lock-in with the frequency variations of the wave. The oscillations, rather than the impressed wave, are then detected by the circuit, and limiting is provided by the self-oscillations of the circuit.

However, the invention may be better understood when the following description is read with reference to the accompanying drawings in which.

Figure 3A:
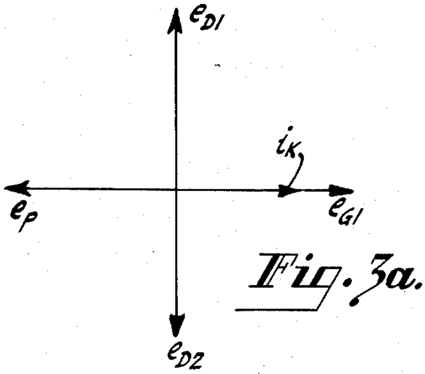
Figure 3B:
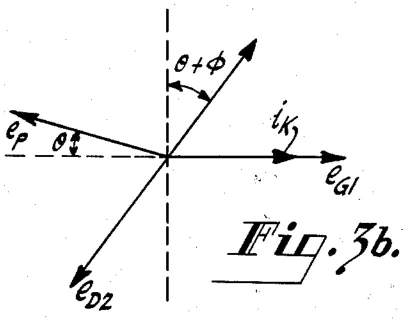

Figures 3*a* and 3*b* are graphs showing vector diagrams illustrating certain other operational features of the invention.

Figure 4:
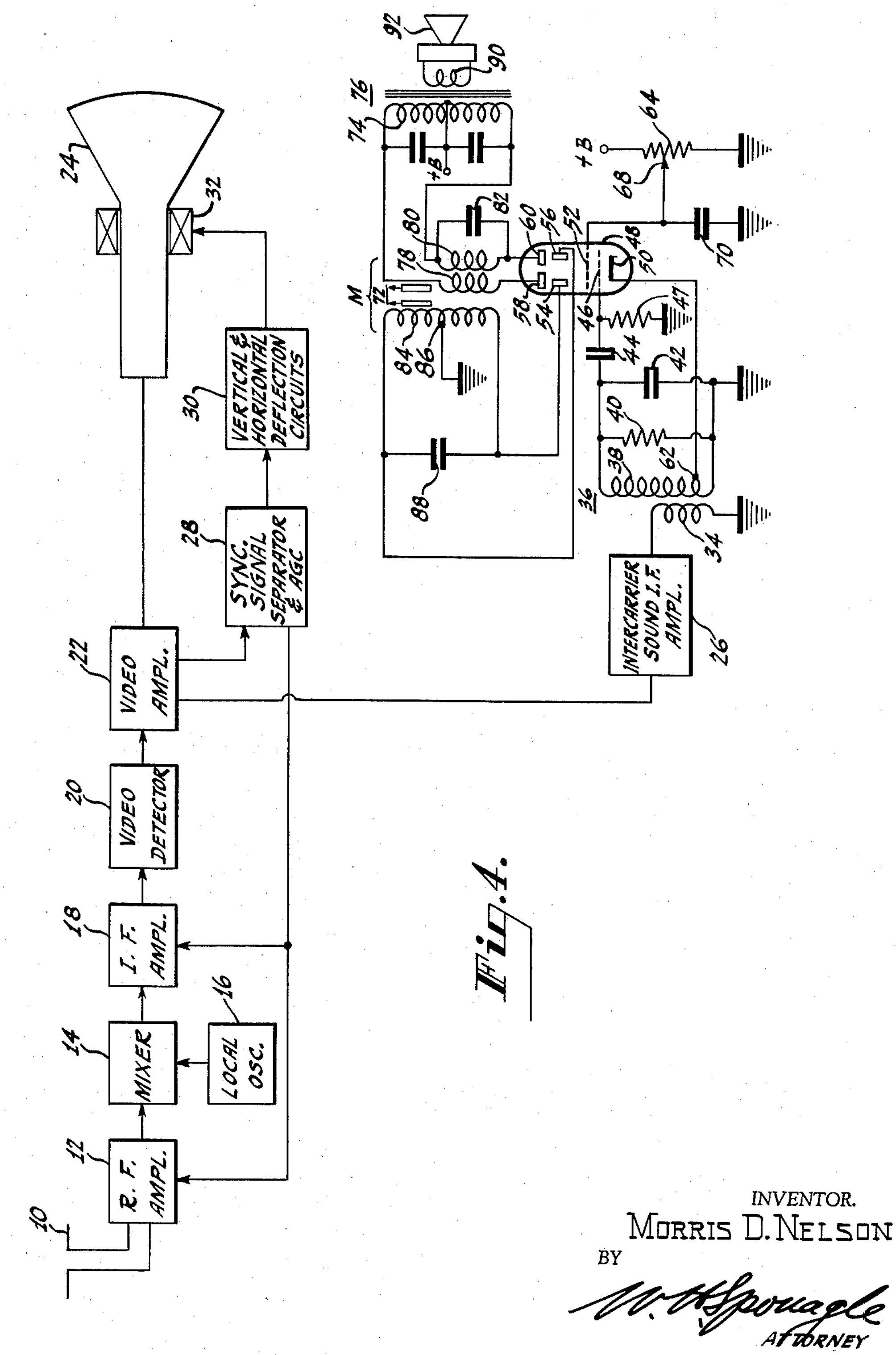

Figure 4 is a schematic circuit diagram of a television receiver having a frequency modulation detector circuit illustrating another embodiment of the invention.

Figure 1:
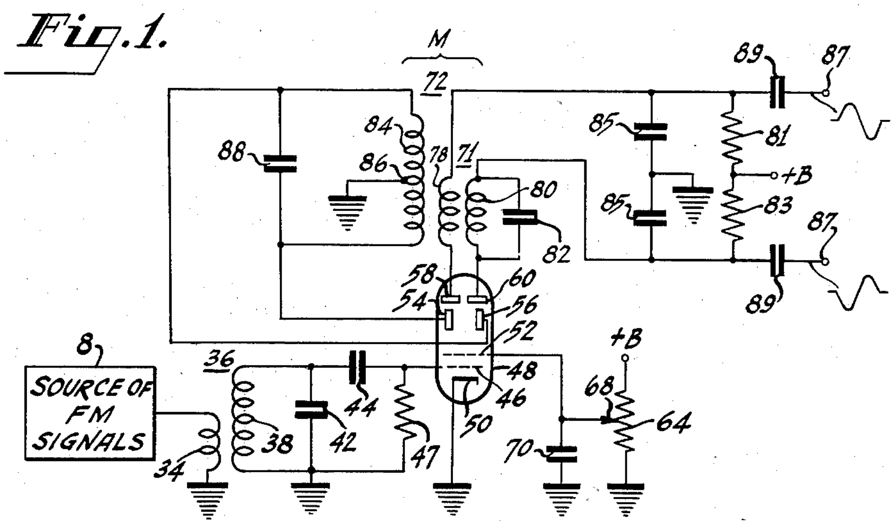
Figure 1 is a schematic circuit diagram of a frequency modulation detector circuit embodying the invention.

Referring now to the drawings, and in particular to Figure 1, a source of frequency modulated signals 8 is connected to apply a frequency modulated wave to the primary winding 34 of a wave input transformer for the detector circuit. The secondary winding 38 of the transformer is tuned to the center frequency of the applied wave by a capacitor 42 connected thereacross. The wave available across the secondary winding 38 is applied through a grid-leak biasing network to the control grid 46 of a beam switching electron tube 48. The grid-leak biasing network includes a capacitor 44 connected between the secondary winding 38 and the control grid 46, and a resistor 47 connecting the control grid 46 to ground or a point of reference potential for the circuit. The structure of the beam switching tube 48 includes a cathode 50, the control grid 46, a screen grid 52, a pair of beam deflecting electrodes 54, 56 and a pair of collector anodes 58, 60, in the order named. The elements of the tube 48 are arranged to generate a beam of electrons which are derived from the cathode 50 and accelerated toward the collector anodes 58, 60. The action provided by the deflecting electrodes 54, 56 (which may be in the form of plates or grids) is to switch the electron beam from one collector anode to the other. Positive operating potential is supplied to the screen electrode 52 from a potentiometer 64 connetced between a source of operating potential, B+, and ground by connecting the screen 52 to a variable contact or slider 68 on the potentiometer 64. The screen 52 is bypassed to ground for radio frequency signals by a bypass capacitor 70.

The collector anodes 58, 60 are connected individually to separate halves of the primary winding 71 of a second transformer 72. The primary winding 71 includes a first half-winding 78 and a second half-winding 80. The half windings 78, 80 are bifilar wound and are tuned to the center frequency of the received wave by a single capacitor 82 connected across the second half-winding 80. Since the two half-windings are tightly coupled by the bifilar winding, a single capacitor 82 effectively tunes both halves of the primary winding 71. Specifically, the first collector anode 58 is connected to one end of the first half-winding 78 and the second collector anode 60 is connected to one end of the second half-winding 80. The remaining ends of the first and second half-windings 78, 80 are connected together by a pair of serially connected resistors 81 and 83, and a source of operating voltage, +B, is applied to the circuit at the junction of the resistors 81 and 83. Radio frequency bypass capacitors 85 are connected between ground and the ends of the resistors 81 and 83 remote from their common junction.

The output signal of the detector circuit is available, in push-pull form, across the resistors 81, 83, and is coupled to a pair of output terminals 87 through a pair of coupling capacitors 89.

Returning to the second transformer 72, the secondary winding 84 has one end connected to the first deflecting electrode 54 and the other end connected to the second deflectng electrode 56. A center tap 86 of the secondary winding 84 is connected directly to ground. The two halves of the secondary winding 84 are also bifilar wound. The secondary winding 84 is tuned to the center frequency of the recevied wave by a capacitor 88 connected thereacross, and is critically coupled to the primary winding 71.

Figure 2:
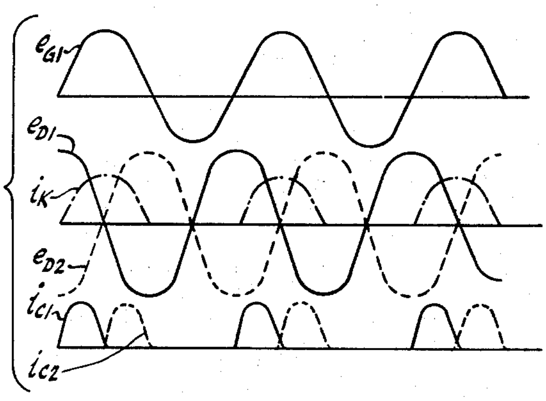
Figure 2 is a graph showing curves and illustrating certain operational features of the invention.

In order to describe the operation of the detector circuit, assume that an unmodulated wave is applied from the source 8 to the primary winding 34 of the wave input transformer 36. The wave is applied through the grid-leak biasing network to the control grid 46. The bias on the control grid 46 is such as to provide current flow in the form of pulses, which may be for a period equal to a half cycle of the voltage appearing on the grid 46. This is illustrated in Figure 2 where the curve $e_{G1}$ is the voltage on the grid 46 and $i_K$ is the current flow from the cathode 50. The current pulses are accelerated by the screen grid 52 between the deflector electrodes 54 and 56 toward the collector anodes 58 and 60. The current pulses strike the collector anodes 58, 60 and a voltage is induced in the half-windings 78, 80 of the primary winding 71 of the second transformer 72. This voltage will be 180° out of phase with respect to the voltage appearing on the grid 46. This phase relation is shown in the vector diagram Figure 3*a*, assuming a clockwise vector rotation, with the voltage on the grid 46 being indicated as $e_{G1}$ and the voltage on the collector anodes 58, 60, being indicated as $e_P$. Current flow in the half-windings 78, 80 will induce a voltage in the secondary winding 84. Because the secondary winding is resonant at the frequency of the induced voltage in the primary winding 71, the voltages induced in the secondary are 90° out of phase with the voltage, $e_P$, in the half-windings 78, 80. And since the secondary winding 84 is center tapped to ground, the voltages induced therein will be 180° out of phase with each other. The voltages appearing at the extremities of the secondary winding 84 are applied to the first and second deflecting electrodes 54 and 56. These voltages are indicated in the vector diagram of Figure 3*a* as vectors $e_{D1}$ and $e_{D2}$, with $e_{D1}$ leading $e_P$ by 90°, and $e_{D2}$ lagging $e_P$ by 90°.

The pulses of current that flow from the cathode 50 toward the collector anodes 58, 60 are distributed between the first and second collector anodes 58 and 60 by the action of the deflecting electrodes 54 and 56, that is, half of the electrons of each pulse will be deflected to the first collector anode 58 and the other half will be deflected to the second collector anode 60. This action is illustrated in Figure 2, where the voltages appearing on the deflecting electrodes 58, 68, $e_{D1}$, and $e_{D2}$ are plotted on the middle curve on the same reference with the cathode current, $i_K$. It will be noted from the last curve of Figure 2 that the current in the first collector anode 58, $i_{C1}$, is approximately half of the total cathode current, $i_K$, and the current in the second collector anode 60, $i_{C2}$, which is shown in dotted lines, is approximately the remaining half of the cathode current, $i_K$. This will be the situation at the center frequency of a frequency modulated wave, that is, an unmodulated wave.

Assume now that the frequency of the wave on the control grid 46 decreases to a lower frequency. The resonant circuits connected with the collector anodes 58, 60 now appear capacitive and the voltage induced in the collector anode circuits now leads the voltage on the grid 46 by more than 180°. This situation is indicated on the vector diagram shown in Figure 3*b*. The voltage $e_P$ is indicated as leading the voltage $e_{G1}$ by a 180° plus the angle $\theta$. The voltages $e_{D1}$ and $e_{D2}$ that are induced in the secondary winding 84 will experience a double phase shift with respect to $e_{G1}$ (that is, through the tube 48 and through the second transformer 72), and are different from their original position by the angle $\theta+\phi$. The voltages appearing on the deflecting electrodes 54 and 56 are thus at a different phase than normal with respect to the voltage appearing on the grid 46, $e_{G1}$. The current pulses thus will not divide equally between the collector anodes 58 and 60, but one, say the first collector anode 58, will receive more current than the other.

As the frequency of the received signal increases above the center frequency the current division between the collector anodes will reverse, and the second collector anode 60 now receives more current. Thus an output signal will be delivered across the resistors 81 and 83 which varies, in push-pull fashion, in accordance with the modulating signal appearing on the frequency modulated wave. This push-pull signal may be made to drive a push-pull output power amplifier without the use of an additional amplifier.

Control of the strength of the output signal from the detector is accomplished by varying the position of the slider 68 on the potentiometer 64 to control the direct voltage on the screen 52. The screen voltage determines the quantity of electrons allowed to reach the collector anodes 58, 60 and thus the strength of the output signal.

Referring now to Figure 4, a television receiver embodying a frequency modulation sound detector constructed in accordance with the invention, includes an antenna 10, radio frequency amplifier 12, mixer 14, local oscillator 16, and IF amplifier 18, arranged and connected as indicated to receive a transmitted television signal and supply an amplitude modulated video intermediate frequency (IF) carrier and a frequency modulated sound IF carrier to the video detector 20. The video detector 20 detects the video IF carrier and provides the video output signal, which is amplified in a video amplifier 22 and applied to a kinescope 24. The amplified video signal from the video amplifier 22 is also supplied to a synchronizing signal separator and AGC circuit 28 which delivers horizontal and vertical synchronizing pulses to the horizontal and vertical deflection circuits 30 of the receiver. The deflection circuits supply energy to a conventional cathode ray beam deflection yoke 32, to properly deflect the electron beam of the kinescope 24.

The video detector 20 also acts as a mixer for the video and sound IF carriers to provide a frequency modulated sound intercarrier IF signal having a frequency corresponding to the frequency displacement of the video and sound radio frequency carriers during radio frequency transmission of a television signal. According to present day television standards, this sound intercarrier IF signal has a value of 4.5 megacycles. The 4.5 megacycle signal is amplified in the video amplifier 22 and applied to an intercarrier sound IF amplifier 26. Output signals from the intercarrier sound IF amplifier 26 are applied to the primary winding 34 of the wave input transformer 36 of the frequency modulation detector circuit constructed in accordance with the invention and being similar to the circuit described in Figure 1. The secondary winding 38 of the transformer 36 in this embodiment, however, serves also as a portion of an oscillatory circuit, which will be more fully explained hereinafter, and has a resistor 40 and a tuning capacitor 42 associated therewith, each connected individually across the secondary winding 38. One end of the secondary winding 38 is connected to ground or a point of reference potential for the circuit, and the other end is connected through a coupling capacitor 44 to the control grid 46 of a beam switching electron tube 48. The control grid 46 is returned to ground through a resistor 47.

A self-oscillating circuit is provided by connecting the cathode 50 to an intermediate tap point 62 on the secondary winding 38 of the input transformer 36, and by connecting the screen electrode 52 to a source of positive operating potential, +B, through a potentiometer 64. Specifically, a variable contact 68 of the potentiometer 64 is connected directly to the screen electrode 52, which is also bypassed to ground for radio frequency signals by a bypass capacitor 70. It will be noted that the oscillatory portion of the circuit just described is in the form of a Hartley oscillator. Other forms of oscillators could be used, such as, a Colpitts type.

The detected output signal is available between the collector anodes 58 and 60 and appears directly across the primary winding 74 of an audio output transformer 76 connected therebetween. The secondary winding 90 of the transformer 76 is connected to a loudspeaker 92, where the detected electrical signal is reproduced as sound.

In order to describe the operation of the detector circuit, assume that no signal is aplied from the intercarrier sound IF amplifier 26 through the primary winding 34 of the transformer 36. The cathode-to-screen circuit of the tube 48 produces oscillations having a frequency determined by the resonant frequency of the tuned secondary winding 38 of the transformer 36. This frequency is made equal to the center frequency of the received wave that is to be detected, in this case 4.5 megacycles. The oscillator circuit is biased so that the flow of current from the cathode 50 is in the form of pulses of energy at the oscillator frequency. These current pulses are accelerated by the screen electrode 52 toward the collector anodes 58, 60 in the same manner as described with reference to Figure 1. The tube 48 and its associated circuitry process the oscillator wave in exactly the same manner as the directly applied wave in the circuit described in Figure 1, and the current divides equally between the collector anodes 58, 60, at center frequency, in the same manner.

If now a frequency modulated wave is applied from the intercarrier sound IF amplifier 26 to the primary winding 34 of the transformer 36, and is of sufficient magnitude, the frequency of the oscillations will lock in with the frequency of the frequency modulated wave applied to the primary winding 34. Thus the voltage appearing on the control grid 46 varies in frequency in accordance with the frequency variations of the frequency modulated wave. The amplitude of the oscillations, however, will be substantially unaffected by any variations in amplitude that may be present on the frequency modulated wave.

The circuit detects the oscillations that are produced therein in the same manner as the directly applied wave is detected in the circuit shown in Figure 1. Since the oscillations of the circuit are locked in with the frequency deviations of the received signal, the output signal developed at the collector anodes 58, 60 will be the desired demodulated signal.

Control of the sound volume or power delivered by the circuit is affected, as in the circuit of Figure 1, by varying the potential of the screen electrode 52. This is accomplished by positioning the slider 68 of potentiometer 64 which is connected between +B and ground. The energy content of the current pulses allowed to pass the screen electrode 52 are varied by varying the screen voltage.

It will be appreciated that the output signal from the detector circuit will be substantially amplitude insensitive, since the amplitude of the oscillator signal is substantially unaffected by any amplitude variations or amplitude modulation that may appear on the frequency modulated wave applied to the detector circuit. At the center frequency of the wave the device is inherently insensitive to amplitude signals that may appear on the control grid 46 since the current pulses divide equally between the collector anodes 58 and 60 at center frequency and any amplitude variations of the RF current pulses through the tube will be canceled out or balanced in the output circuit.

As an example, a circuit constructed in accordance with the invention and utilizing a type 6AR8 electron tube has the transformers 36 and 72 tuned to 4.5 megacycles. The grid leak capacitor 44 and resistor 47 are 0.001 microfarad and 10,000 ohms, respectively, and the damping resistor 40 connected across the secondary winding 38 of the transformer 36 is 2,200 ohms. The signal connected to the primary winding 34 required to lock in the detector is 100 millivolts. The circuit delivered 900 milliwatts audio output signal. This amount of output power is adequate to drive a reasonably efficient loudspeaker.

What is claimed is:

1. In a frequency variation response circuit for demodulating a frequency modulated wave including an electron tube having a control grid, a pair of beam deflecting electrodes, a pair of electron collector anodes, and means for developing an electron beam within said tube and accelerating said beam between said beam deflecting electrodes and toward said pair of collecting anodes, an electron beam deflecting circuit comprising in combination, means for applying a frequency modulated wave to said circuit, circuit means connected to said electron tube for developing self-oscillations on said control grid in accordance with the frequency variations of said frequency modulated wave, means including a transformer having primary windings connected to be traversed by the current through said collecting anodes for developing a pair of oppositely phased voltages having a phase relation with respect to the voltage on said control grid which varies in accordance with the frequency deviations of said frequency modulated wave, means including a secondary winding of said transformer for applying said pair of oppositely phased voltages to said pair of deflecting electrodes to divide the electron beam between said collector anodes in accordance with the frequency deviations of said frequency modulated wave, and means for deriving a detected output signal between said collector anodes.

2. In a frequency variable response circuit for demodulating a frequency modulated wave, said circuit including an electron tube having a cathode, a control grid, a pair of beam deflecting electrodes, a pair of electron collector anodes, means for developing an electron beam, and means for accelerating said beam between said beam deflecting electrodes and toward said pair of collector anodes, the combination comprising means including circuit connections between said cathode and said control grid for generating self-oscillations at substantially the frequency of the frequency modulated wave, means for applying a frequency modulated wave between said cathode and said control grid to lock the frequency of said self-oscillations to the instantaneous frequency of said frequency modulated wave, means including a transformer having a pair of primary windings and a secondary winding and having said pair of primary windings individually connected to said pair of collector anodes for developing oppositely phased voltages having a phase relation with respect to the voltage on said control grid that varies in accordance with the frequency deviation of said frequency modulated wave, means including the secondary winding of said transformer for applying said pair of voltages to said pair of deflecting electrodes to switch said electron beam between said collector anodes in accordance with the frequency deviations of said frequency modulated wave, and means connected between said collector anodes for deriving a detected output signal thereacross.

3. In a frequency variation response circuit for demodulating a frequency modulated wave, said circuit including an electron tube having a control grid, a pair of deflecting electrodes, a pair of electron collector anodes, and means for developing an electron beam in said tube and accelerating said beam between said beam deflecting electrodes and towards said pair of collector anodes, an electron beam deflecting circuit comprising in combination means connected to said electron tube for providing self-oscillations therein, means for applying a frequency modulated wave to said circuit for locking the frequency of said self-oscillations to the frequency of said frequency modulated wave, means for developing a pair of oppositely phased voltages having a phase relation with respect to said self-oscillations that varies in accordance with the frequency deviations of said self-oscillations, means for applying said pair of voltages to said pair of deflecting electrodes to switch said electron beam between said collector anodes in accordance with the frequency deviations of said self-oscillations, and means for deriving a detected output signal between said collector anodes.

4. In a frequency variation response circuit for demodulating a frequency modulated wave, said circuit including, an electron tube having a cathode, a control grid, a screen grid, a pair of deflecting electrodes, a pair of electron collector anodes, and means for developing an electron beam in said tube and accelerating said beam between said beam deflecting electrodes and toward said pair of collector anodes, the combination comprising means connected between said cathode and said control grid for causing self-oscillations in said circuit, means for applying a frequency modulated wave to said circuit for locking the frequency of said self-oscillation to the frequency of said frequency modulated wave, means including a transformer having a pair of bifilar primary windings and a secondary winding and having said pair of primary windings individually connected to said pair of collector anodes for developing a pair of oppositely phased voltages having a phase relation with respect to said self-oscillations that varies in accordance with the frequency deviations of self-oscillations, means including the secondary winding of said transformer for applying said pair of voltages to said pair of deflecting electrodes to divide the current of said electron beam between said collector anodes in accordance with the frequency deviations of said self-oscillator, and means for deriving a detected output signal between said collector anodes.

5. In a frequency variation response circuit for demodulating a frequency modulated wave, said circuit including an electron tube having a cathode, a control grid, a screen grid, a pair of deflecting electrodes, a pair of electron collector anodes, means for developing an electron beam in said tube and accelerating said beam between said beam deflecting electrodes and towards said pair of collecting anodes, the combination comprising means connected between said cathode and said control grid for causing self-oscillations at substantially the frequency of a frequency modulated wave to be demodulated, means for applying a frequency modulated wave to said circuit for locking the frequency of said self-oscillations to the frequency of said frequency modulated wave, a wave signal transformer having a pair of bifilar primary windings and a center tapped secondary winding, means for connecting one end of each of said pair of primary windings to one of said pair of collector anodes, means for connecting the ends of said secondary winding individually to said beam deflecting electrodes, means for tuning said pair of primary windings and said secondary winding to the center frequency of said frequency modulated wave, a signal output circuit, means for connecting said signal output circuit between said collector anodes to develop a detected output signal across said output circuit, and means for applying a controllable direct voltage to said screen grid to vary the output signal.

6. In a frequency variation response circuit for demodulating a frequency modulated wave, said circuit including, an electron tube having a control grid, a pair of deflecting electrodes, a pair of electron collector anodes, and means for developing an electron beam in said tube and accelerating said beam between said beam deflecting electrodes and toward said pair of collector anodes, an electron beam deflecting circuit comprising in combination means connected to said electron tube for causing self-oscillations in said tube at substantially the frequency of a frequency modulated wave to be detected, means for applying a frequency modulated wave to said circuit for locking the frequency of said self-oscillations to the frequency of said frequency modulated wave, means for developing a pair of oppositely phased voltages having a phase relation with respect to said self-oscillations that varies in accordance with the frequency deviations of said self-oscillations, means for applying said pair of voltages to said pair of deflecting electrodes to switch said electron beam between said collector anodes in accordance with the frequency deviations of said self-oscillations, means including an audio frequency transformer having primary and secondary windings and having the primary winding thereof connected between said collector anodes for deriving a detected output signal therebetween, a loudspeaker, and means for connecting said secondary winding of said audio frequency transformer to said loudspeaker to apply the detected output signal thereto.

References Cited in the file of this patent

UNITED STATES PATENTS

| | | |
|---|---|---|
| 2,269,688 | Rath | Jan. 13, 1942 |
| 2,419,696 | Smith | Apr. 29, 1947 |
| 2,451,584 | Stone | Oct. 19, 1948 |
| 2,523,043 | Metcalf | Sept. 19, 1950 |

FOREIGN PATENTS

| | | |
|---|---|---|
| 134,729 | Australia | Oct. 18, 1949 |

OTHER REFERENCES

"Application of the Autosynchronized Oscillator to Frequency Demodulation" by Woodyard in "Proceeding of the I.R.E.," May 1937, pages 610–612.

"Synchronized Oscillators as F–M Receiver Limiters" in "Electronics," August 1944, page 108 et. seq.